US008260947B2

(12) United States Patent
Mine et al.

(10) Patent No.: US 8,260,947 B2
(45) Date of Patent: Sep. 4, 2012

(54) MEDIA DELIVERY ARRANGEMENTS INCLUDING TIME INFORMATION PROVIDED TOGETHER WITH MEDIA DATA

(75) Inventors: Hiroshi Mine, Yokohama (JP); Tadashi Takeuchi, Sagamihara (JP); Ken Nomura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1271 days.

(21) Appl. No.: 11/099,490

(22) Filed: Apr. 6, 2005

(65) Prior Publication Data

US 2005/0223107 A1 Oct. 6, 2005

(30) Foreign Application Priority Data

Apr. 6, 2004 (JP) ................................ 2004-111681

(51) Int. Cl.
*G06F 15/16* (2006.01)
(52) U.S. Cl. ........................................ 709/231; 709/246
(58) Field of Classification Search .................. 709/219, 709/230–231, 246; 708/204; 370/465
See application file for complete search history.

(56) References Cited

U.S. PATENT DOCUMENTS

| 7,072,962 | B2 * | 7/2006 | Hori | 709/224 |
|---|---|---|---|---|
| 7,191,242 | B1 * | 3/2007 | Serenyi et al. | 709/231 |
| 7,372,819 | B2 * | 5/2008 | Martin | 370/252 |
| 2002/0015400 | A1 * | 2/2002 | Morinaga et al. | 370/345 |
| 2002/0176418 | A1 | 11/2002 | Hunt et al. | |
| 2002/0188692 | A1 * | 12/2002 | Horiuchi et al. | 709/213 |
| 2003/0028662 | A1 * | 2/2003 | Rowley et al. | 709/231 |
| 2003/0185238 | A1 * | 10/2003 | Strasser et al. | 370/473 |
| 2005/0055425 | A1 * | 3/2005 | Lango et al. | 709/219 |

FOREIGN PATENT DOCUMENTS

| JP | 2000-209258 | 7/2000 |
|---|---|---|
| JP | 2002-125001 | 4/2002 |

OTHER PUBLICATIONS

Kuan-Sheng Hsueh and Sheng-De Wang, "A Packet-Based Caching Proxy with Loss Recovery for Video Streaming" [Online], Dec. 16-18, 2002 [Jul. 24, 2008], IEEE, Proceedings of the 2002 Pacific Rim International Symposium on Dependable Computing (PRDC'02), [http://ieeexplore.ieee.org/iel5/8447/26604/01185637.pdf] pp. 1-6.*
H. Schulzrine et al., "Real Time Streaming Protocol(RTSP)", The Internet Engineering Task Force, Apr. 1998.
H. Cchulzrinne et al., "A Transport Protocol for Real-Time Applications", The Internet Enginnering Task Force, Jan. 1996.

* cited by examiner

*Primary Examiner* — Saleh Najjar
*Assistant Examiner* — Eric W Shepperd
(74) *Attorney, Agent, or Firm* — Antonelli, Terry, Stout & Kraus, LLP.

(57) ABSTRACT

A media delivery apparatus for relaying media data streaming-delivered from a server to a client terminal through a network, including a receiving portion for receiving packets transmitted from the server to the network when stream-delivering the media data, and a storage device, wherein: each of the packets contains at least one media data element as a split of the media data and is constructed according to a certain protocol; and the receiving portion extracts the media data element, generates information necessary for reconstructing a packet having the same construction as that of the packet containing the media data and stores the necessary information in addition to the extracted media data in the storage device.

5 Claims, 9 Drawing Sheets

FIG.2
HINT FILE 111
| HEADER INFORMATION | TIME | OFFSET | SIZE |
|---|---|---|---|
| HEADER INFORMATION 1 | T1 | X1 | Y1 |
| HEADER INFORMATION 2 | T2 | X2 | Y2 |
| ... | | ... | ... |
| HEADER INFORMATION n | Tn | Xn | Yn |
| | ... | ... | ... |
FIG.3A
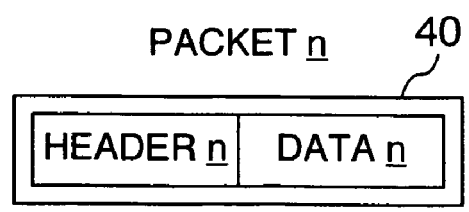
FIG.3B
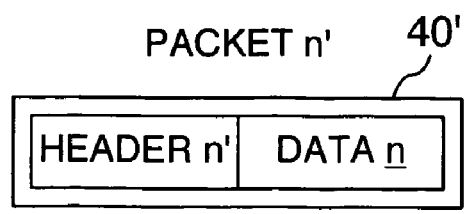

MEDIA DELIVERY ARRANGEMENTS INCLUDING TIME INFORMATION PROVIDED TOGETHER WITH MEDIA DATA

INCORPORATION BY REFERENCE

The present application claims priority from Japanese application JP2004-111681 filed on Apr. 6, 2004, the content of which is hereby incorporated by reference into this application.

BACKGROUND OF THE INVENTION

The present invention relates to a streaming delivery method for transmitting media data such as video, audio, etc. through a network and a proxy delivery apparatus for relaying and delivering streaming data.

Streaming delivery is performed for taking video/audio information of movie, live broadcasting, etc. in a computer, compressing and encoding the video/audio information and delivering the video/audio information to an audience terminal.

Generally, in stream delivery, a delivery server apparatus (hereinafter referred to as "server") managed by a contents provider processes a contents delivery preparation request received from a client terminal apparatus (hereinafter referred to as "client terminal") such as a PC (Personal Computer) or an STB (Set Top Box) operated by a user and sends necessary information on a media file as a subject of streaming delivery back to the client terminal.

When the server receives a delivery control request from the client terminal, the server reads media data in the media file from a storage device such as a hard disk drive. The server splits (packetizes) the read media data into parts (packets) by a suitable size in accordance with a rule accepted by respective applications of the server and the client terminal to thereby construct packets in accordance with a network protocol and continuously transmits the packets to the client terminal through a network at an appropriate communication rate (bit rate).

In streaming delivery, as a protocol for controlling delivery of the delivery control request, the delivery preparation request, etc., there has been standardized RTSP described by H. Schulzrinne and two others, "Real Time Streaming Protocol (RTSP)", April 1998, The Internet Engineering Task Force. As a protocol for transmitting media data by packets constructed according to a network protocol, there has been standardized RTP (Real-Time Transport Protocol) described by H. Schulzrinne and three others, "RTP: A Transport Protocol for Real-Time Applications", January 1996, The Internet Engineering Task Force.

When streaming delivery is performed through a Wide Area Network (hereinafter referred to as "WAN") represented by the Internet, a proxy apparatus is used for attaining warrant of delivery quality and reduction in server load. The proxy apparatus is disposed between the server and the client terminal and in a position near the client terminal. The proxy apparatus has a local storage device. The proxy apparatus performs a process for streaming delivery of media data in place of the server. Media data delivered by the proxy apparatus is data distributed from the server in advance or a replica of media data taken out from packets according to the network protocol when streaming delivery packets to be delivered from the server to the client terminal are relayed. The media data is stored in the local storage device.

For example, in U.S. Patent Application Publication No. 2002/0176418, there has been disclosed a proxy apparatus in which a replica of media data to be relayed is formed regardless of the network protocol for transmitting the media data so that a part or all of contents delivered from the server can be stored (cached) in the local storage device and delivered in a transmission protocol and a bit rate according to the request from the client terminal (FIGS. 3 and 9).

When streaming delivery is performed, the server needs to process media data in accordance with parameters specific to the media data to be delivered in such a manner that the media data is split into packets according to the network protocol by a suitable size and that the packets are transmitted in accordance with the delivery bit rate. Generally, the parameters specific to the media data are stored as header information of a media file in the form depending on the format of the media file such as MPEG2 (Moving Picture Experts Group layer 2), MPEG4 (Moving Picture Experts Group layer 4) or other commercial media formats. The parameters vary in terms of interpretation, that is, in terms of control necessary for delivery.

For this reason, the server needs different processes according to media formats to be used in streaming delivery. Servers exclusively used according to media formats are required or delivery control application programs exclusively used in streaming delivery and operating on a server are required.

Also in the proxy apparatus described in U.S. Patent Application-Publication No. 2002/0176418, delivery control application programs exclusively used according to media formats to be used are required because the U.S. Patent Application Laid-Open has disclosed that the proxy apparatus performs the same streaming delivery as in the server to the client terminal.

The process for storing a replica of media data in the local storage device while relaying packets in a streaming delivery manner is a process depending on each media format. Accordingly, application programs exclusively used according to media formats must be prepared in the proxy apparatus so that the proxy apparatus can satisfy different media formats. As a result, the cost necessary for updating and managing the proxy apparatus becomes high.

When a large-scale delivery network through a WAN is constructed, a large number of such proxy apparatuses are disposed in a position near the client terminal with respect to the server. Accordingly, in the large-scale delivery network, reduction in the equipment and management cost of the proxy apparatuses necessary for new media formats is a problem to be solved.

Accordingly, a proxy apparatus improved in equipment cost and management cost needs to be put into practice.

SUMMARY OF THE INVENTION

The invention provides a media delivery apparatus for storing media data delivered from a server in the form of data capable of being delivered regardless of the media format and streaming-delivering the stored media data to a client terminal.

The invention also provides a technique for reducing the cost necessary for satisfying new media formats in a media data delivery network.

The invention provides a proxy apparatus for storing a replica of media data in a local storage device and performing streaming delivery in accordance with a request from a client terminal, wherein media data is split by the size of a packet to be transmitted to a network in advance so that the split media data is stored in addition to time information indicating the timing of transmission in the local storage device. Because the media data stored is transmitted to the network in accordance with the time information when the media data must be delivered, streaming delivery can be performed at a suitable packet size and at a suitable bit rate.

The invention provides a proxy apparatus for storing a replica of media data in a local storage device when relaying packets of media data streaming-delivered from a server to a client terminal, wherein time information indicating the time of reception of each packet is recoded, in addition to the split media data stored in each packet, in the local storage device. That is, the proxy apparatus according to the invention stores media data in the local storage device in the form independent of media formats without provision of any mechanism for interpreting details of media data.

Moreover, because the streaming delivery process in the proxy apparatus can be separated into a delivery control process depending on each media format and a delivery process independent of media formats, the proxy apparatus may be separated into a delivery control proxy device for performing a delivery control process and a media delivery storage device for performing a delivery process. Moreover, in a large-scale delivery network, a plurality of media delivery storage devices may be disposed. Because the delivery control proxy device lighter in load than the delivery portion controls the plurality of media delivery storage devices, the delivery control proxy device can satisfy new media formats simply in such a manner that the delivery control proxy device is updated.

Incidentally, the term "streaming" in the invention means a technique by which the client terminal can reproduce media data in parallel to downloading the media data without necessity of completion of downloading all the media data from the server.

According to the invention, media data delivered from the server is stored in the form of data independent of media formats so that streaming delivery to the client terminal can be performed.

In a large-scale delivery network, the cost necessary for satisfying new media formats can be reduced.

These and other benefits are described throughout the present application. A further understanding of the nature and advantages of the invention may be realized by reference to the remaining portions of the specification and the attached drawings.

BRIEF DESCRIPTION OF THE DRAWINGS

FIG. 2 is a view for explaining media data storage formats according to the first embodiment;

FIGS. 3A and 3B are views for explaining structures of packets according to the first embodiment;

DETAILED DESCRIPTION OF THE INVENTION

Embodiments of the invention will be described with reference to the drawings.

Figure 1:
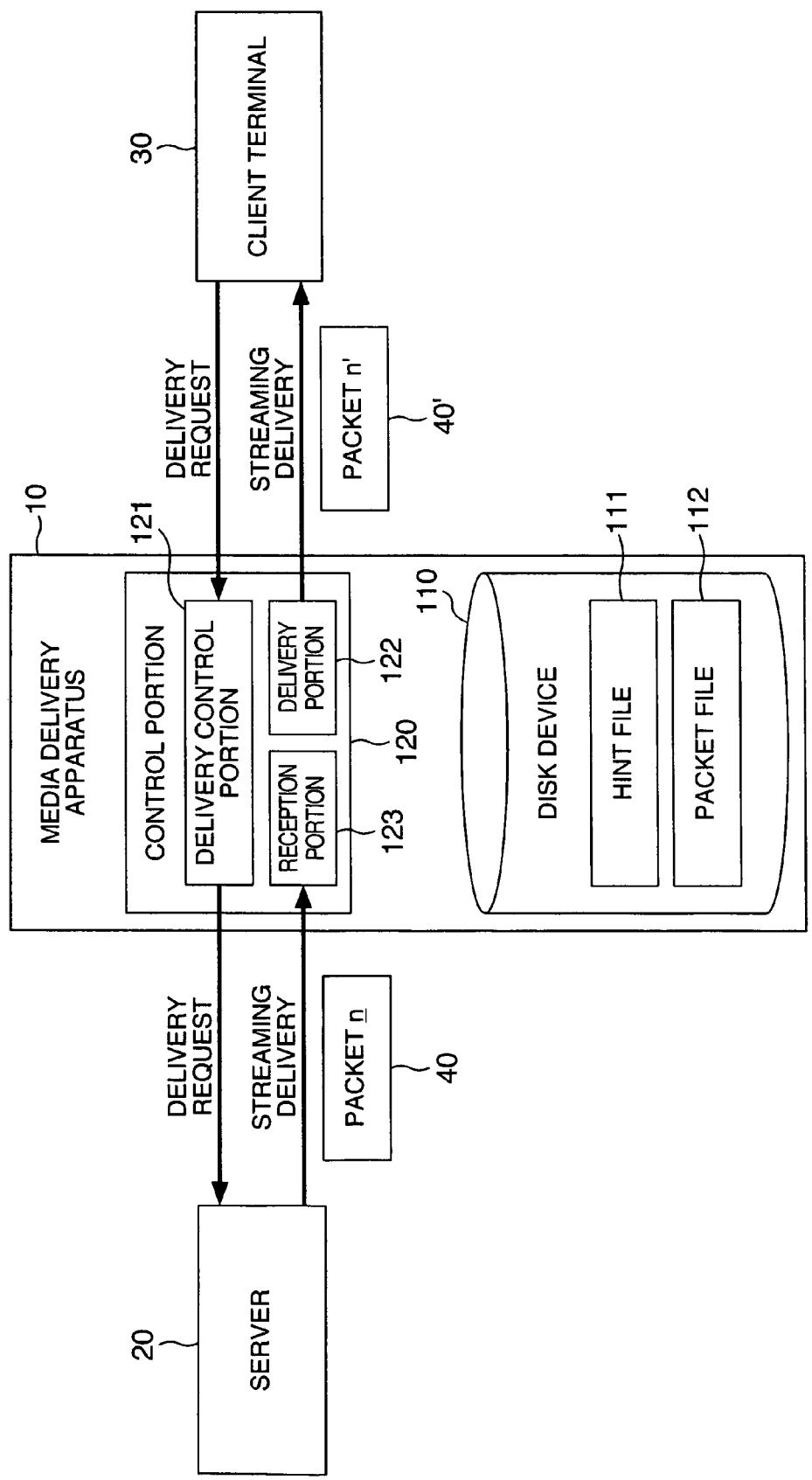
FIG. 1 is a block diagram illustrating the configuration of a media delivery apparatus according to a first embodiment.

FIG. 1 shows the configuration of a media delivery apparatus according to a first embodiment of the invention. The media delivery apparatus 10 is located between a server 20 for performing streaming delivery of media data and a client terminal 30 for receiving and playing back the media data delivered by streaming. For example, the media delivery apparatus 10 accepts a delivery request from the client terminal 30 in the form of RTSP (Real Time Streaming Protocol), packetizes media data elements as a result of splitting the media data in the form of RTP (Real-Time Transport Protocol) and performs streaming delivery of the media data elements.

The respective apparatuses are connected to one another through a not-shown WAN 70 such as the Internet. In the following embodiment, RTSP is shown as an example of a delivery control protocol, and RTP is shown as an example of a protocol for transmitting media data as packets.

The media delivery apparatus 10 includes a local storage (hereinafter referred to as "disk device") 110 for storing media data in an unique form independent of media formats, and a control portion 120 for reading the media data from the disk device 110 in accordance with a request from the client terminal 30 and performing a streaming delivery process.

For example, the disk device 110 is constituted by an SCSI (Small Computer System Interface) hard disk drive. The disk device 110 stores a replica of media data in a format with a hint file 111 and a packet file 112.

As shown in FIG. 2, information such as header information obtained from each received RTP packet, time, offset and size are stored as a record set in the hint file 111. Each record has one-to-one correspondence with a packet transmitted through the WAN 70.

The header information stores auxiliary information necessary for reconstruction of each packet, such as information of a marker bit, etc. contained in an RTP header when the packet is transmitted in the RTP format. The time is a relative time with reference to the time when a first packet is transmitted. The time indicates timing for transmitting a corresponding packet.

The packet file 112 is a collection of media data elements contained in each packet. The offset and the size are used for indicating the position of each media data element in the packet file 112.

By use of the hint file 111 and the packet file 112, for example, an RTP packet n' 40' to be transmitted in the n-th order can be expressed so that the packet n' 40' is composed of a header n' and data n as shown in FIG. 3B and that the packet n' 40' should be transmitted after Tn from the transmission of the first packet. The header n' is generated from information stored in the header information n, a sequence number changed for every delivery, an SSRC (Synchronization Source), etc. The data n is a media data element which is expressed by an offset Xn and a size Yn and which is the same as that contained in the RTP packet received by the media delivery apparatus 10.

Incidentally, the hint file 111 and the packet file 112 may be generated in such a dynamic manner that media data delivered from the server 20 is relayed as described above, or may be generated in such a static manner that an adequate conversion tool is used for converting a media file stored on the server 20 in advance.

The media file is data of contents stored in the disk. Parameters specific to the media data are contained as header information of the media file. The media data means video data per se of the contents. Media data to be streaming-delivered is extracted from the media file.

The control portion 120 includes a delivery control portion 121, a delivery portion 122, and a reception portion 123. The delivery control portion 121 processes an RTSP delivery request from the client terminal 30. The delivery portion 122 sends RTP packets as streaming to the client terminal 30. The reception portion 123 receives RTP packets delivered from the server 20 when media data are accumulated.

Although FIG. 1 shows the delivery control portion 121, the delivery portion 122 and the reception portion 123 as processing portions independent of one another in order to clarify the functions of these portions, these portions may be embodied practically by execution of software on a general-purpose computer.

Figure 4:
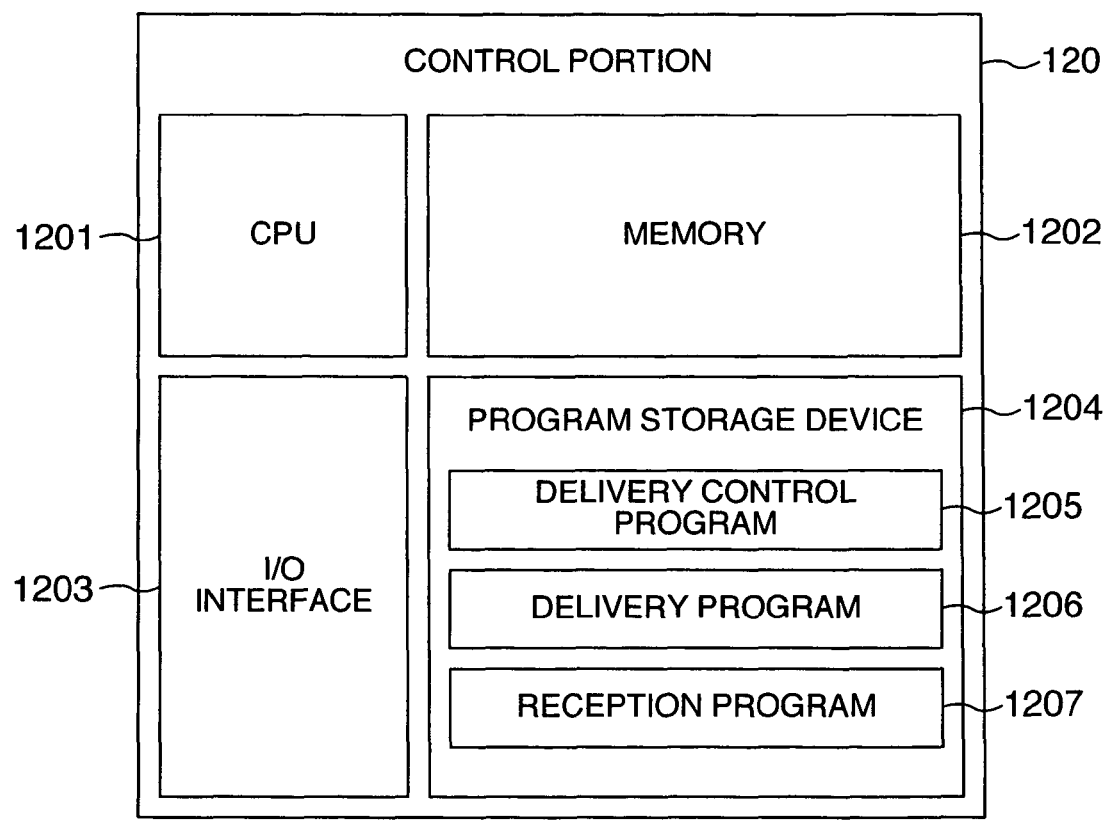
FIG. 4 is a block diagram showing the configuration of a control portion according to the first embodiment.

For example, as shown in FIG. 4, the control portion 120 may be a computer including a CPU (Central Processing Unit) 1201 for executing programs, a memory 1202 for temporarily storing the programs and data, an I/O interface 1203 for controlling a disk device, a network interface, etc., and a program storage device 1204 such as a nonvolatile semiconductor memory or a hard disk for storing the programs.

In the computer, the CPU 1201 may appropriately read a delivery control program 1205 for performing a delivery control process, a delivery program 1206 for performing a delivery process and a reception program 1207 for performing a reception process from the program storage device 1204 into the memory 1202 and processes these programs 1205 to 1207 in a parallel processing manner or in a time division manner to thereby achieve the respective processing portions.

The respective programs may be stored in the program storage device 1204 in advance, or may be introduced into the program storage device 1204 through a removable storage medium or communication medium (the WAN 70 or a carrier or a digital signal on the WAN 70) which can be used by the computer, as occasion demands.

An operation of the delivery control portion 121 for delivery of media data will be described with reference to FIG. 5. This operation is an interactive operation which is performed in accordance with a request from the client terminal.

The delivery control portion 121 accepts a streaming delivery request complied with RTSP from the client terminal 30 and starts a delivery control process. The delivery control portion 121 receives a delivery preparation request such as a DESCRIBE method, a SET_PARAMETER method, a GET_PARAMETER method, a SETUP method, etc. in RTSP from the client terminal 30 (S101) and extracts necessary information such as the name of a media file, the number of a reception port of the client terminal 30, etc. from the delivery preparation request.

The delivery control portion 121 transfers authentication information, etc. contained in the DESCRIBE method and the SET_PARAMETER method of the delivery preparation request to the server 20 (S102) to entrust the server 20 with a process such as examination of an access right to media data, accounting, etc.

Successively, the delivery control portion 121 receives a response from the server 20 and judges whether delivery has been permitted or not (S103).

When delivery has not been permitted ("No" in S103), the delivery control portion 121 gives the client terminal 30 a delivery rejection response containing the reason why delivery could not be permitted, such as "401 Unauthorized", etc. (S104). Then, the delivery control portion 121 terminates the process.

When delivery has been permitted ("Yes" in S103), the delivery control portion 121 gives a delivery preparation request acknowledgement to the client terminal 30 (S105) and continues the process. The delivery preparation request acknowledgement contains contents descriptive information, such as the bit rate of media data and the number of video tracks, contained in the response from the server 20.

Upon reception of a delivery control request such as a PLAY method, etc. in RTSP from the client terminal 30 (S106), the delivery control portion 121 gives a delivery instruction to the delivery portion 122 in accordance with the kind and parameters of the received delivery control request (S107). When, for example, the delivery control request is a start request such as a PLAY method, the delivery instruction is an instruction to start transmission and contains the name of a media file, the start position of delivery, etc. When, for example, the delivery control request is a stop request such as a PAUSE method, a TEARDOWN method, etc., the delivery instruction is an instruction to stop transmission.

If the playback time during a playback has passed or an abnormality such as disconnection from the client terminal 30 happens while the delivery control portion 121 is waiting for reception of the request in S106, the delivery control portion 121 terminates the process.

Then, the delivery control portion 121 judges whether the delivery control request from the client terminal 30 is a stop request or whether the delivery time has reached the end of the media file or not (S108). When the delivery control request is a stop request or the delivery time has reached the end of the media file, the delivery control portion 121 terminates the process. Otherwise, the delivery control portion 121 repeats the process in accordance with the delivery control request.

Figure 6:
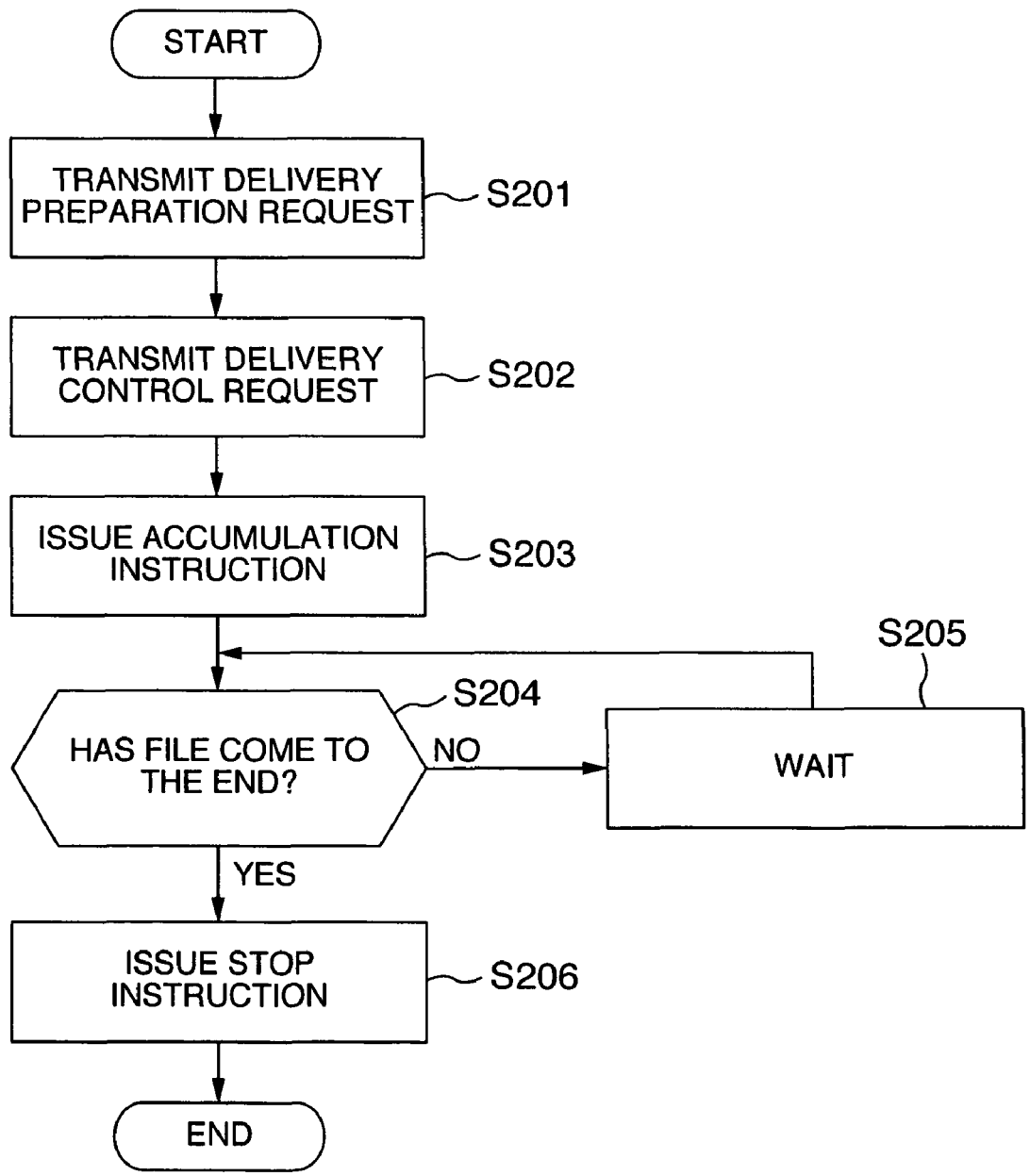
FIG. 6 is a flow chart for exemplifying an accumulation operation of the delivery control portion according to the first embodiment.

An operation of the delivery control portion 121 for accumulation of media data will be described with reference to FIG. 6. The process shown in FIG. 6 is a batch process which is performed in accordance with an instruction given from an administrator of the media delivery apparatus 10.

For accumulation of media data, the delivery control portion 121 transmits a delivery preparation request containing the name of a media file, etc. to the server 20 (S201) and obtains information such as a playback time of the media data, etc. from an acknowledgement received from the server 20.

Successively, the delivery control portion 121 transmits a delivery control request to the server 20 to request start of streaming delivery of the media data (S202) and gives an accumulation instruction to the reception portion 123 (S203). The reception portion 123 accumulates RTP packets in accordance with the accumulation instruction and then makes a judgment based on information of playback time, etc. as to whether the media file has come to the end or not (S204). The delivery control portion 121 waits for the file's arrival at the end (S205).

When the delivery control portion 121 decides that all the media data have been already transmitted by the server 20 so that the media file has come to the end ("Yes" in S204), the delivery control portion 121 gives a stop instruction to the reception portion 123 (S206) and then terminates the process.

Figure 5:
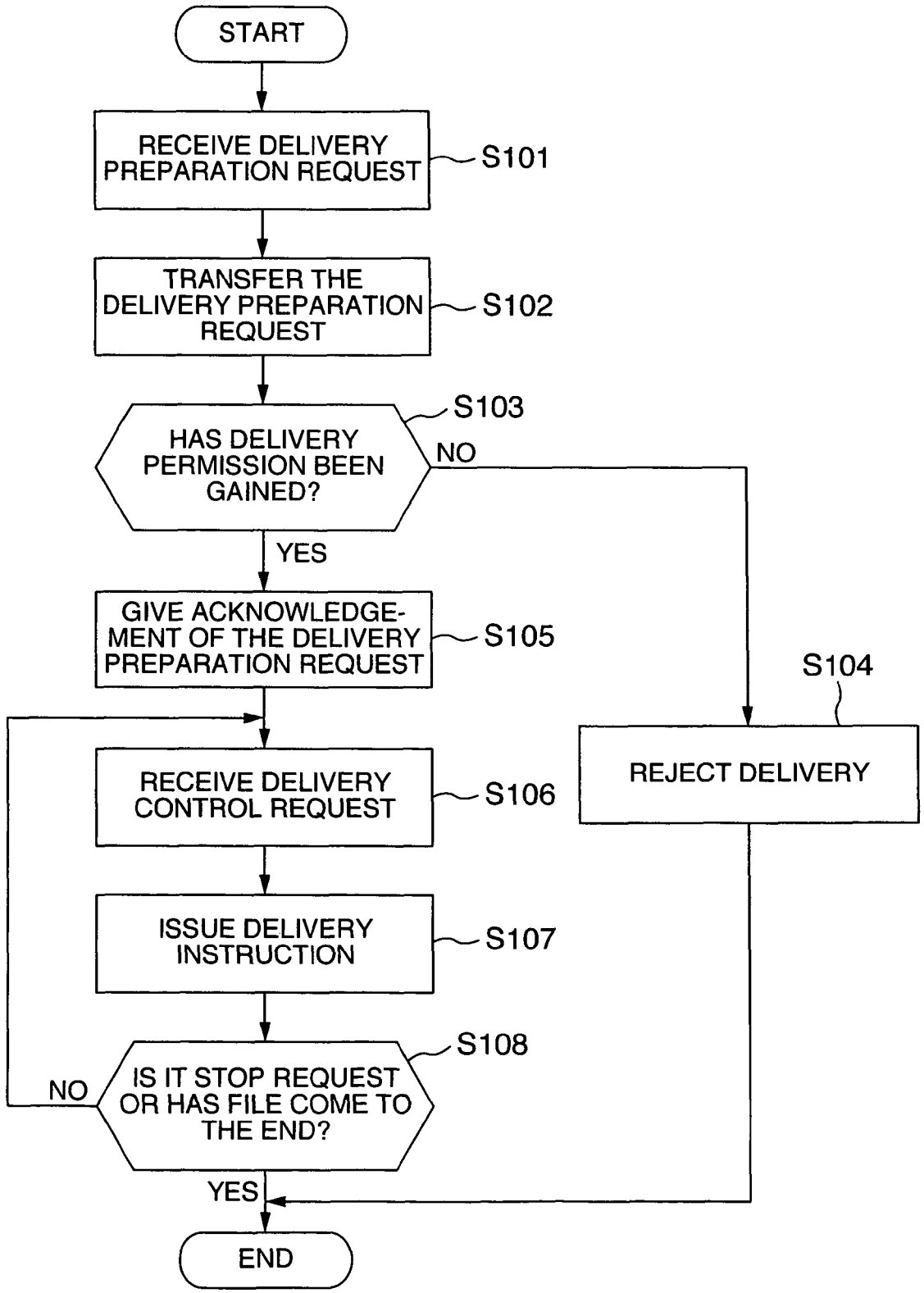
FIG. 5 is a flow chart for exemplifying a delivery operation of a delivery control portion according to the first embodiment.

Incidentally, in the procedure, the delivery preparation request transmitting step (S201) and the delivery control request transmitting step (S202) may be performed by a method in which a delivery request actually transmitted from the client terminal 30 to the server 20 is relayed in the same manner as that in FIG. 5. Accumulation of media data in accordance with the delivery request from the client terminal 30 may be performed in such a parallel processing manner that an accumulation process which will be described later is performed by the reception portion 123 during the relay process in which packets delivered from the server 20 are received in the reception portion 123 and transmitted from the delivery portion 122 to the client terminal 30.

Figure 7:
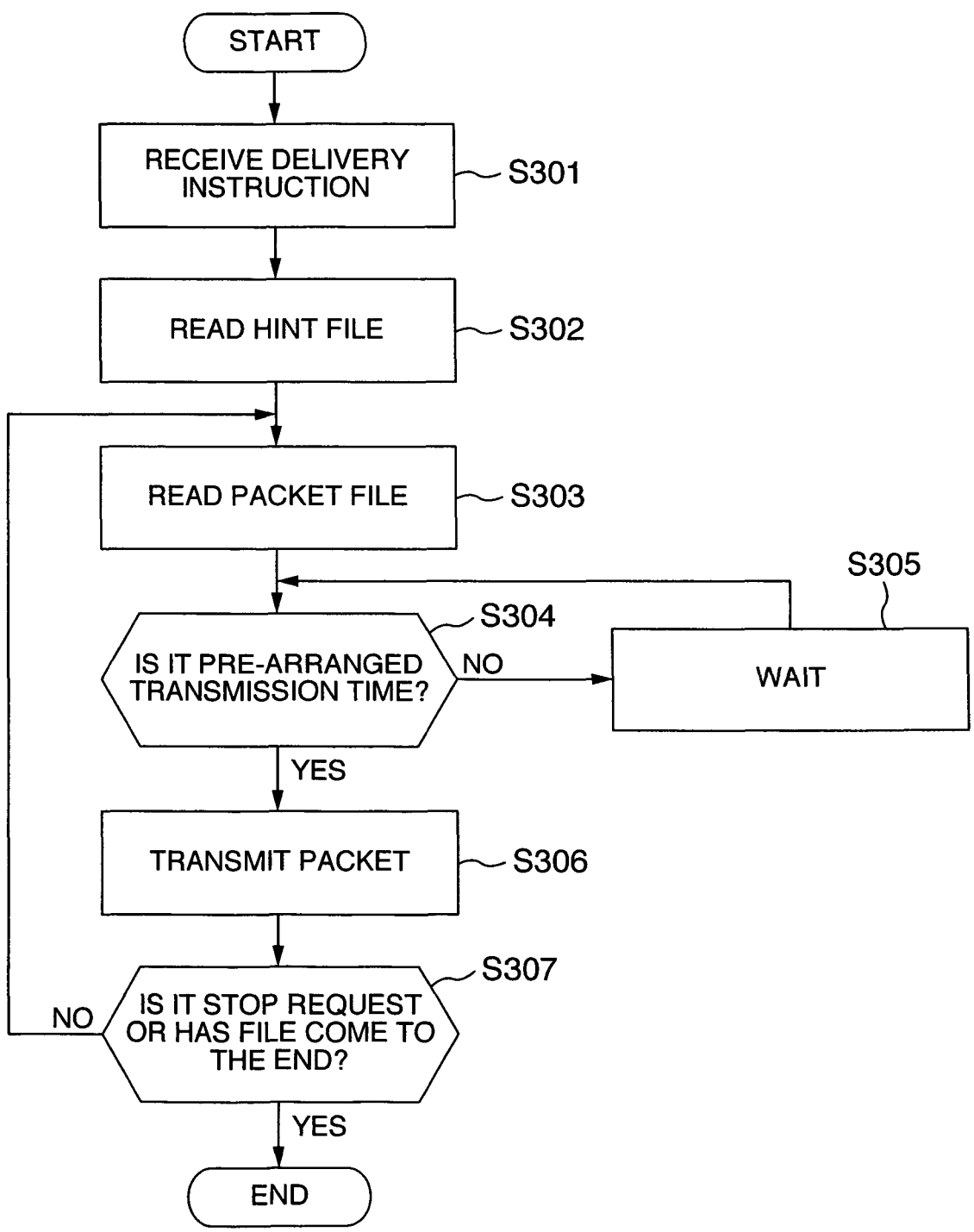
FIG. 7 is a flow chart for exemplifying an operation of a delivery portion according to the first embodiment.

An operation of the delivery portion 122 will be described with reference to FIG. 7.

The delivery portion 122 receives the delivery instruction from the delivery control portion 121 as shown in S107 in FIG. 5 (S301) and obtains information such as the name of a media file, etc. contained in the delivery instruction. The delivery portion 122 obtains-information such as the name of a hint file, the name of a packet file, etc. based on the media file name. Successively, the delivery portion 122 reads a hint file 111 corresponding to the media file name from the disk device 110 (S302), reads a media data element of the packet file 112 expressed by a record of the hint file 111 and generates a packet by use of header information read from the hint file 111 and the media data element read from the packet file 112 (S303).

The delivery portion 122 makes a judgment on the basis of the relative time information contained in the hint file 111 and the transmission time of the first packet as to whether it has come to a pre-arranged transmission time (S304). When it has not come to the pre-arranged transmission time, the delivery portion 122 waits until the pre-arranged transmission time (S305). When it has come to the pre-arranged transmission time, the delivery portion 122 transmits the generated packet to the client terminal 30 (S306).

Then, the delivery portion 122 judges whether a stop instruction has been received from the delivery control portion 121 or whether the media file has come to the end (S307). The end of the media file is equivalent to the end of the records of the corresponding hint file 111 and to the end of the packet file 112. The end of the media file can be detected based on the number of effective records in the hint file 111 or EOF (End of File) judgment of the packet file 112.

When a stop instruction is received from the delivery control portion 121 or when the file has come to the end, the delivery portion 122 terminates the process. Otherwise, the delivery portion 122 repeats the process of reading media data necessary for constructing a next packet to be transmitted, from the packet file 112, generating the packet and transmitting the generated packet at a designated time. Incidentally, termination of the process based on the delivery stop instruction may be provided as a process of interrupting an ordinary delivery process in order to stop delivery immediately in accordance with the stop instruction from the delivery control portion 121.

Figure 8:
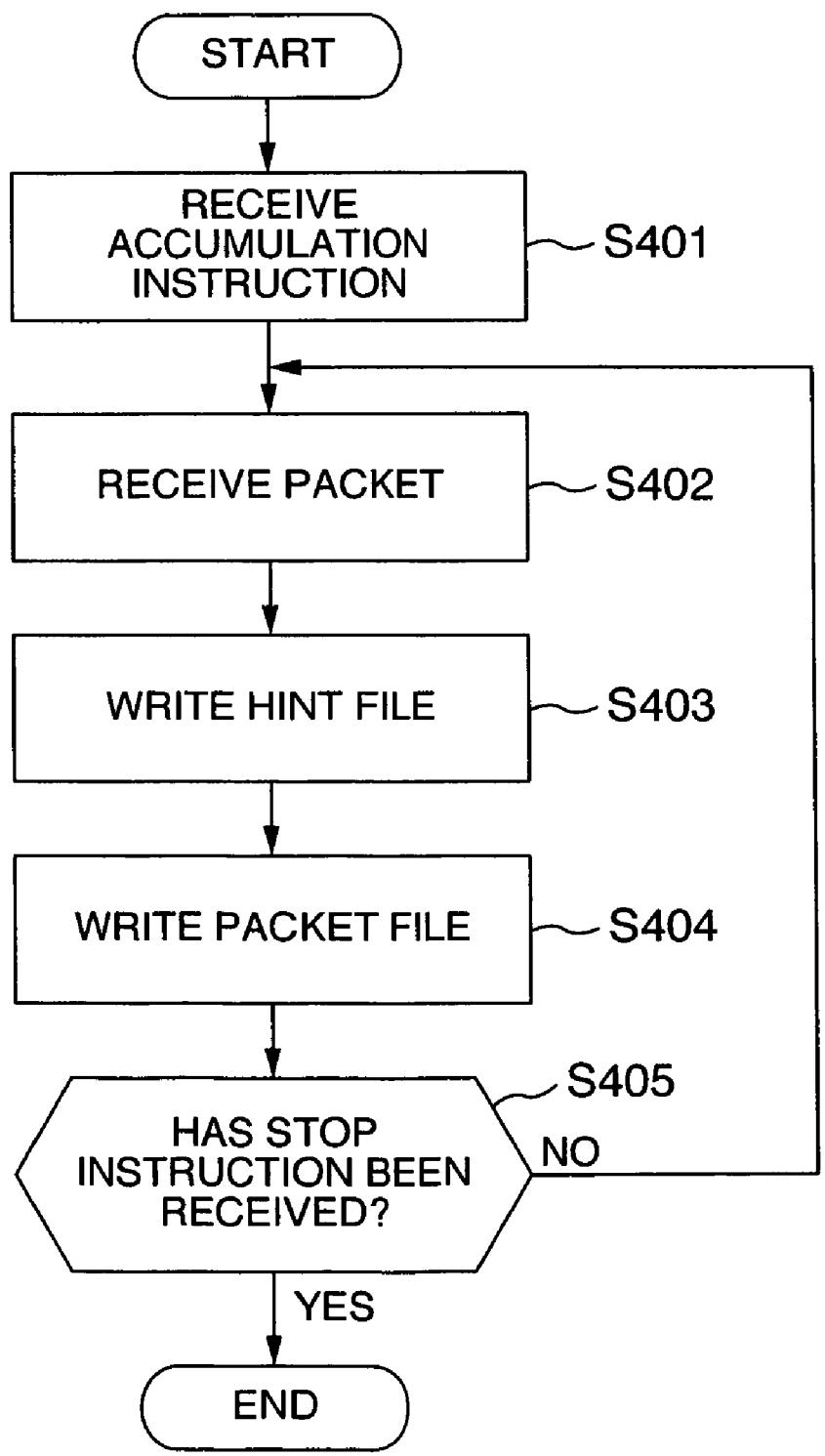
FIG. 8 is a flow chart for exemplifying an operation of a reception portion according to the first embodiment.

An operation of the reception portion 123 will be described with reference to FIG. 8.

The reception portion 123 starts an accumulation process in accordance with an accumulation instruction given from the delivery control portion 121. The reception portion 123 receives the accumulation instruction from the delivery control portion 121 (S401) and obtains information such as the name of a media file, etc. contained in the accumulation instruction. Successively, the reception portion 123 receives a packet streaming-delivered from the server 20 (S402), additionally writes a new entry based on header information, reception time, etc. concerning the received packet into the hint file 111 (S403) and additionally writes media data into the packet file 112 (S404). When, for example, the media data encoded by MPEG2 are delivered in RTP, the packet file 112 is provided as an MPEG2 file.

When, for example, the reception portion 123 receives a packet n 40 which is shown in FIG. 3A and which is the n-th one received after Tn from the reception of the first packet, the reception portion 123 generates header information n from a header n, adds the reception time Tn and the size of the packet file 112 expressed by an offset Xn and a size Yn of data n to the hint file 111 and adds the data n to the packet file 112.

Then, the reception portion 123 judges whether a stop instruction has been received from the delivery control portion 121 or not (S405). When the stop instruction has been received, the reception portion 123 terminates the process. When the stop instruction has not been received, the reception portion 123 repeats the process of receiving a packet and adding media data to the hint file 111 and the packet file 112.

In the aforementioned embodiment, the media delivery apparatus 10 stores media data in the disk device 110 in the format with the hint file 111 and the packet file 112 independent of media formats. Both the streaming delivery and accumulation of the media data are controlled by the control portion 120. For streaming delivery, the delivery control portion 121 accepts a delivery request from the client terminal 30, transfers the delivery request to the server 20 in accordance with necessity and gives a delivery instruction to the delivery portion 122.

The delivery portion 122 constructs each packet from the hint file 111 and the packet file 112 in accordance with the delivery instruction and transmits the packet to the client terminal 30 in accordance with time information designated by the hint file 111. For accumulation of media data, the delivery control portion 121 gives an accumulation instruction to the reception portion 123. The reception portion 123 receives each packet delivered from the server 20 in accordance with the accumulation instruction and accumulates the media data as the hint file 111 and the packet file 112.

Since delimiters and header information for packetizing media data and transmission timing can be found from these files, the media delivery apparatus 10 can accumulate the media data delivered from the server 20 in the format independent of media formats and perform streaming delivery to the client terminal 30 by using RTP.

The transmission protocol in the embodiment is not limited to the illustrated RTP. Any other protocol may be used as the transmission protocol.

A second embodiment of the invention will be described in the case where a media delivery apparatus is used for accumulation and delivery of live streaming video. The drawings and reference numerals used in the first embodiment are also used in the description here.

In the media delivery apparatus 10, when live video streaming-delivered from a server 20 is received by a reception portion 123, the live video is accumulated as a hint file 111 and a packet file 112 in a format independent of media formats by the method described in Embodiment 1.

When the server 20 is a pull type server which starts delivery in accordance with a request, the server 20 can be made to start streaming delivery in such a manner that the delivery control portion 121 requests the server 20 to start delivery or in such a manner that the delivery control portion 121 receives a delivery request from the client terminal 30, rewrite a client IP address, etc. of an RTSP message with that of the media delivery apparatus 10 and transfers the RTSP message to the server 20.

In the latter case, the reception portion 123 sends the received packets to a delivery portion 122 while accumulating the received packets in a disk device 110, and the delivery portion 122 transfers the packets to the client terminal 30, so that live video can be relayed while accumulated. When the server 20 is of a push type, the server 20 may be set so that the live video can be delivered to the media delivery apparatus 10.

Conceive the case where a user makes a temporary stop (referred to as "PAUSE") request in the client terminal 30 receiving streaming delivery of live video from the media delivery apparatus 10 relaying and accumulating the live video.

In the background art, when the user makes a pause request in streaming delivery of live video and makes a playback restart request after a while, the client terminal 30 skips paused video and starts a playback of video from the point of time when the playback restart request is made.

This is because the client terminal 30 has not received the paused video data due to the fact that the server 20 stopped streaming delivery of the live video at the point of time when the PAUSE request in RTSP was received from the client terminal 30 and that the server 20 restarts streaming delivery of the live video at the point of time when a PLAY request is received.

Upon reception of a PAUSE request from the client terminal 30, the media delivery apparatus 10 according to the embodiment stops transfer of RTP packets to the client terminal 30 but continues accumulation of the live video streaming-delivered from the server 20 in the disk device 110. The delivery control portion 121 stores an absolute time of reception of the PAUSE request in a storage region (memory) 1202 where session information with the client terminal 30 is recorded. For example, the time information on that occasion may be a relative time with reference to the start time of the live video.

Upon reception of a PLAY request from the client terminal 30 to restart the playback, the delivery portion 122 refers to information stored in the hint file 111, reads the accumulated video data from a position corresponding to the time of reception of the PAUSE request of the packet file 112 and starts streaming delivery to the client terminal 30. In this manner, it is possible to change the relay of streaming delivery of the live video over to on-demand delivery without re-connection of RTSP, and it is possible to achieve restart of the playback after the pause without skipping of any video data while the client terminal 30 need not to buffer the streaming-delivered video data for a long time.

Next, conceive the case where the client terminal 30 requests the media delivery apparatus 10 to perform streaming delivery of live video which are being accumulated.

In the background art, it was impossible to designate a time prior to the present time in streaming delivery of live video to deliver the past live video or return the time to a previous time during the playback of the live video. This is because the server according to the background art specializes in real-time encoding of live video and processing streaming delivery of the encoded video data so that the server according to the background art cannot hold the past video data.

While the media delivery apparatus 10 according to the embodiment relays streaming delivery of live video, the media delivery apparatus 10 accumulates the relayed media data (video data in this case) in the disk device 110. When the client terminal 30 makes a request to set a past time as a start time by designating a relative value of the start time with reference to the present time as a negative value in a Range field of the PLAY request in RTSP in accordance with a user's operation of asking the playback at the past time, the media delivery apparatus 10 according to the embodiment refers to information stored in the hint file 111, reads the accumulated video data from a position corresponding to the requested start time in the packet file 112 and starts streaming delivery of the video data to the client terminal 30.

Although there is one client terminal 30 in the system configuration shown in FIG. 1, a plurality of client terminals 30 can be connected in the media delivery apparatus 10 according to this embodiment. Accordingly, time-shift playback can be achieved in streaming delivery of live video when different start times are designated in accordance with different client terminals 30. Similarly, jump playback for going back to a past time can be achieved in streaming delivery of live video when the packet file 112 is read from a time position obtained on the basis of the time reception of a PAUSE request and a relative time value designated in a Range field of the PLAY request. That is, even a user participating in live streaming delivery halfway can view live video by going back to any arbitrary time after the start of the live video.

For example, the relative value of the playback start time may include a value as a part of a URL file name for identifying contents requested for delivery. In this manner, it is possible to change the start time without any change of the playback application program on the client terminal 30.

When the playback application satisfies n-fold speed playback in addition to the jump playback for going back to the past time, the client terminal 30 can perform chase playback of streaming delivery of live video when the client terminal 30 requests the media delivery apparatus 10 to perform stream delivery of live video while designating the magnification of playback speed in a Scale or Speed field of the PLAY request and designating a past time as the start time. This can be achieved when the packet transmission time wait of the delivery portion 122 as described in the step S305 in FIG. 7 is shortened in accordance with the designated magnification of playback speed.

In the aforementioned embodiment, the live video streaming-delivered from the server 20 are accumulated as the hint file 111 including time information and the packet file 112 in the disk device 110 by the media delivery apparatus 10. Accordingly, trick play back such as pause at any arbitrary time in accordance with each client terminal or repetitive playback from a past time can be performed without provision of any special function in the server 20 performing live streaming delivery and without necessity of any long-term buffering of the video data in the client terminal 30.

Figure 9:
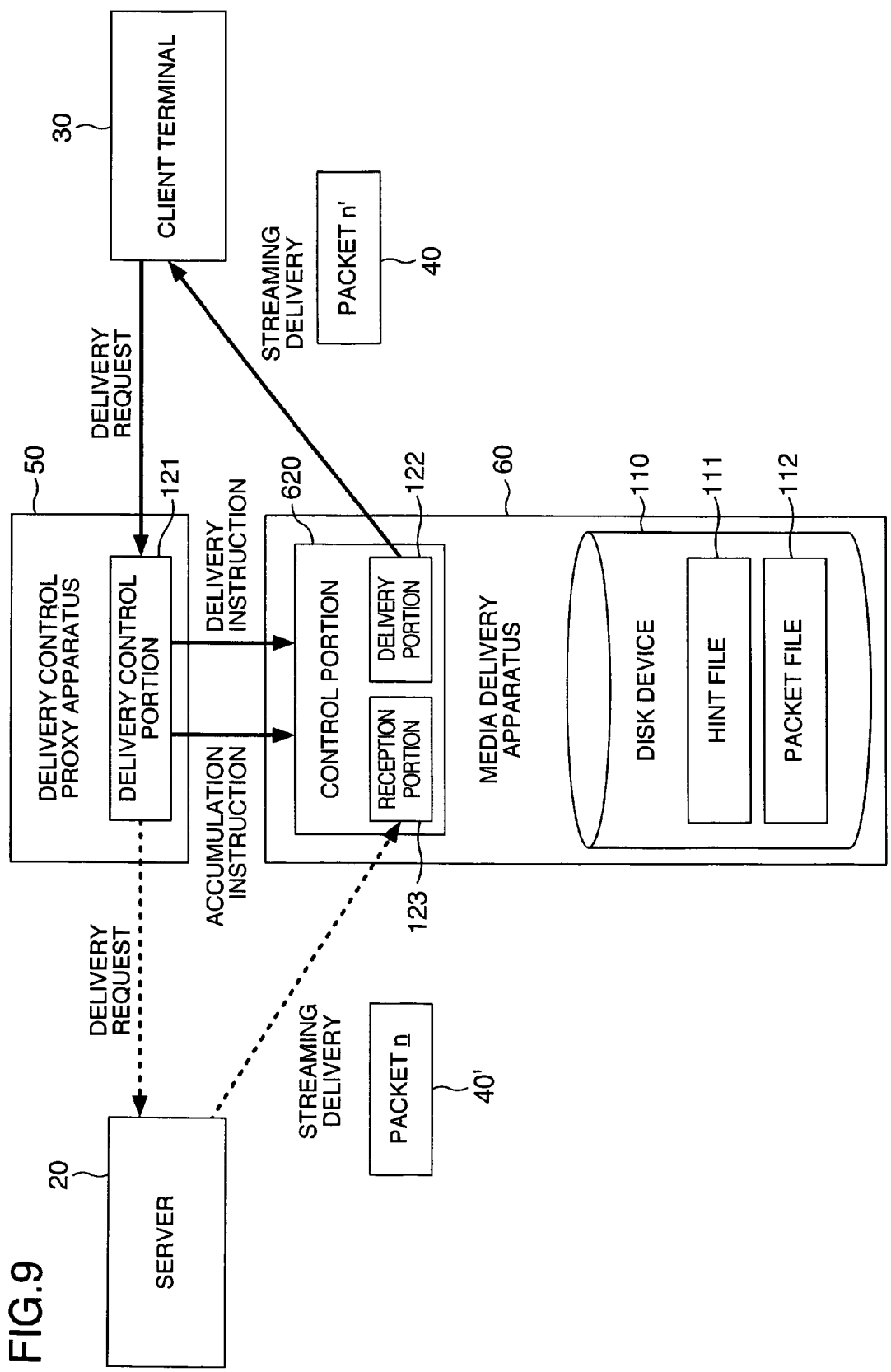
FIG. 9 is a block diagram illustrating the configuration of a delivery control proxy apparatus and a media delivery apparatus according to a third embodiment.

FIG. 9 shows the configuration of a media delivery apparatus 60 and a delivery control proxy apparatus 50 according to a third embodiment of the invention. These apparatuses 50 and 60 are provided by separating the media delivery apparatus 10 according to the first embodiment. Incidentally, constituent members the same as those in the first embodiment are referred to by numerals the same as those in the first embodiment and description thereof will be omitted.

The delivery control proxy apparatus 50 includes a delivery control portion 121. The media delivery apparatus 60 includes a control portion 620, and a disk device 110. The control portion 620 has a delivery portion 122, and a reception portion 123. The disk device 110 stores a hint file 111 and a packet file 112. The delivery control proxy apparatus 50 accepts a delivery request from a client terminal 30, transfers the delivery request to a server 20 in accordance with necessity and gives a delivery instruction to the media delivery apparatus 60.

The delivery portion 122 of the media delivery apparatus 60 constructs each packet from the hint file 111 and the packet file 112 in accordance with the delivery instruction and transmits the packet to the client terminal 30 in accordance with time information designated by the hint file 111.

The delivery control proxy apparatus 50 includes the delivery control portion 121 which is equivalent to that in the first embodiment and which performs a process dependent on the server 20 and each media format. The media delivery apparatus 60 includes the disk device 110, the delivery portion 122 and the reception portion 123 which are equivalent to those in the first embodiment and which perform processes independent of the server 20 and each media format.

That is, the delivery control proxy apparatus 50 is dependent on each media format while the media delivery apparatus 60 is independent of media formats. Accordingly, even when a new media format is used, the situation may be solved by exchanging the delivery control proxy apparatus 50 for another or performing updating such as version up-grading.

Incidentally, in the same manner as in the first embodiment, the delivery control portion 121 of the delivery control proxy apparatus 50 and the control portion 620 of the media delivery apparatus 60 may be provided as portions achieved by execution of software on a computer.

Figure 10:
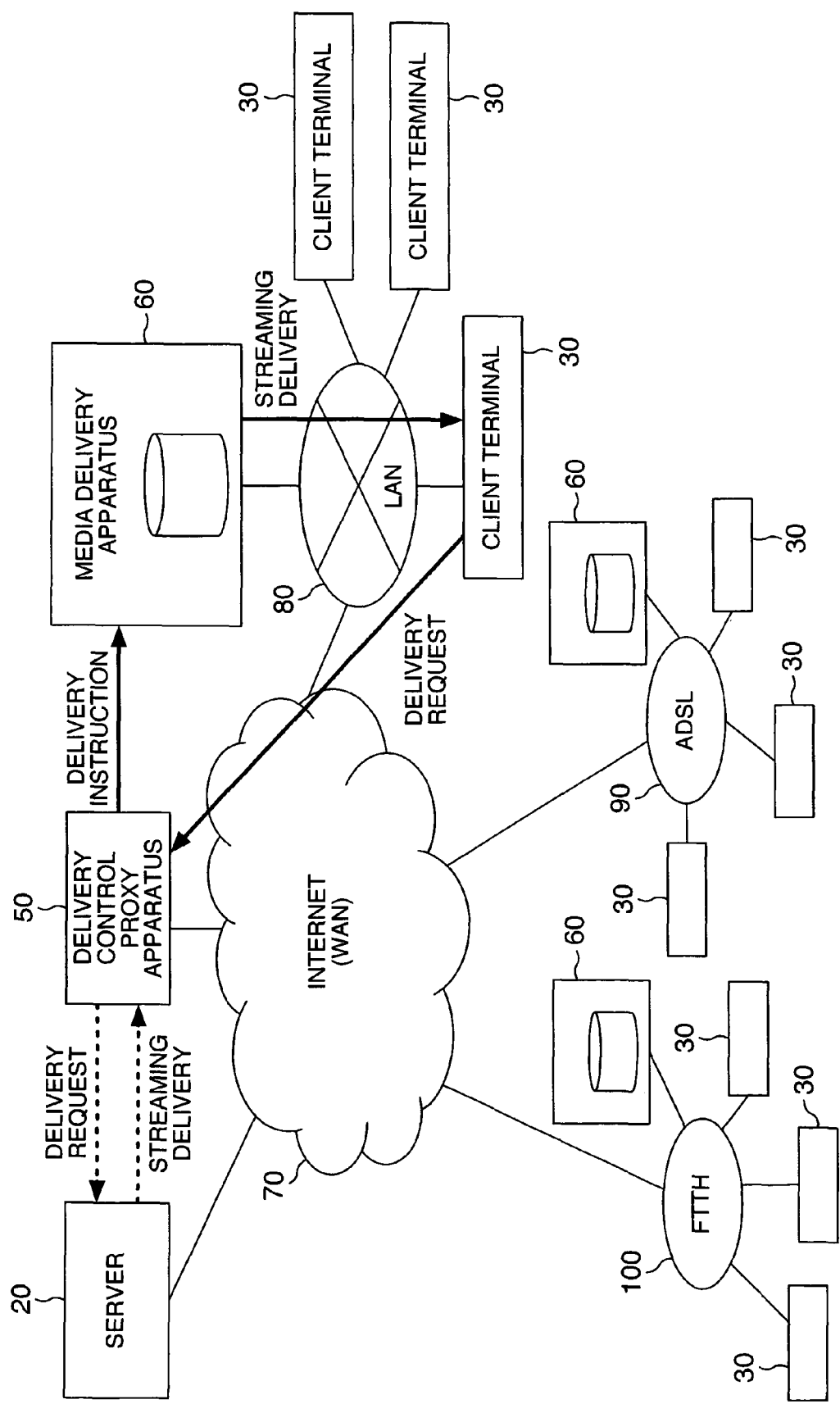
FIG. 10 is a view illustrating the configuration of a large-scale delivery network according to the third embodiment.

FIG. 10 shows the configuration of a large-scale delivery system using a delivery control proxy apparatus 50 and media delivery apparatuses 60 according to the embodiment.

A server 20, client terminals 30, the delivery control proxy apparatus 50 and the media delivery apparatuses 60 are connected to a network (hereinafter referred to as WAN) 70 such as the Internet directly or through a router device, a gateway device, etc. For example, the server 20 may be provided by a contents provider while the client terminals 30 may be prepared by users respectively. There is no problem even when the server 20 and the client terminals 30 are managed by persons different from the administrator of the delivery control proxy apparatus 50 or the media delivery apparatus 60 as well as the administrator of the WAN 70.

The delivery control proxy apparatus 50 may control a plurality of media delivery apparatuses 60 to issue a delivery instruction to an adequate one of the media apparatuses 60 such as one located nearest to a client terminal 30 in accordance with a request from the client terminal 30.

Generally, in streaming delivery, a delivery control process is lighter in load and narrower in required network bandwidth than a delivery process. For this reason, there is no problem even when a plurality of media delivery apparatuses 60 are controlled by one delivery control proxy apparatus 50 while the delivery control proxy apparatus 50 is connected to the client terminals 30 and the media delivery apparatuses 60 through a WAN 70 as a network.

In this embodiment, the media delivery apparatus 60 located in a position near to a corresponding client terminal 30 in terms of the network, that is, the media delivery apparatus 60 located on a so-called edge site can perform streaming delivery to the client terminal 30 in accordance with a delivery instruction given from the delivery control proxy apparatus 50. Selection of the media delivery apparatus 60 may be determined, for example, by checking a hop count or an IP address of the client terminal 30.

That is, the client terminals 30 can receive delivery from the media delivery apparatuses 60 connected on a broadband network, such as an intra-company LAN (local Area Network) 80, an ADSL (Asymmetric Digital Subscriber Line) 90 provided by the same ISP (Internet Service Provider), an FTTH (Fiber To The Home) 100 using an optical fiber network, etc.

In this manner, a necessary network bandwidth between each media delivery apparatus 60 and each client terminal 30 can be retained more easily than the case via the WAN 70 so that high quality media data can be streaming-delivered.

Also in this embodiment, when it is necessary to deal with a server 20 delivering media data in a new media format, the situation can be solved by updating the delivery control proxy apparatus 50 performing a process dependent on each media format without necessity of changing the media delivery apparatuses 60 located dispersively on the respective edge sites. Accordingly, in the large-scale delivery network, the equipment and management cost required for dealing with the new media format can be reduced.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A media delivery apparatus provided on a network at a network location between a server and a client, the media delivery apparatus for relaying media data which is streaming-delivered from the server through the network to the client, the media delivery apparatus comprising a receiving portion for receiving packets transmitted from the server to the network, and a storage device, wherein:

each of the packets contains a media data element which is a segment of the media data, and is constructed according to a predetermined protocol; and the receiving portion is configured to:

extract the media data element from a handled packet, store the media data element having been extracted, using a storing process operating without regard to interpretation of a media format of the media data by associating the media data element with correspondence information enabling reconstructing of a reconstructed packet having a same construction as that of the handled packet containing the media data element, the correspondence information associating together with each other: header information containing at least one parameter of the media format of the handled packet; reception time information of the handled packet, the time information being a time of reception of the handled packet at the media delivery apparatus from the server relative to a time of reception of a predetermined reference handled packet from the server; and pointer information defining a storage space where the media data element is stored in the storage device, the pointer information for extracting the media data element to be contained in the reconstructed packet from the storage device, wherein the correspondence information is stored separately from the media data element; and wherein the media delivery apparatus further comprises a delivery portion for reconstructing the reconstructed packet having the same construction on a basis of the correspondence information for reconstructing the another packet, and transmitting the reconstructed packet to the network at a timing in accordance with the reception time information.

2. A media delivery apparatus according to claim 1, wherein the receiving portion generates the header information on a basis of information contained in the handled packet received from the server.

3. A media delivery system comprising both a media delivery apparatus provided on a network at a network location between a server and a client, and a delivery control proxy apparatus, the media delivery apparatus for relaying media data which is streaming-delivered from a server through a network, to a client terminal, and a delivery control proxy apparatus, wherein:

the media delivery apparatus includes a receiving portion for receiving packets transmitted from the server to the network and a storage device;

each of the packets contains a media data element which is a segment of the media data and is constructed according to a predetermined protocol;

the receiving portion is configured to:

extract the media data element from a handled packet, store the media data element having been extracted, using a storing process operating without regard to interpretation of a media format of the media data by associating the media data element with correspondence information enabling reconstructing of a reconstructed packet having a same construction as that of the handled packet containing the media data element, the correspondence information associating together with each other: header information containing at least one parameter of the media format of the handled packet; reception time information of the handled packet, the time information being a time of reception of the handled packet at the media delivery apparatus from the server relative to a time of reception of a predetermined reference handled packet from the server; and pointer information defining a storage space where the media data element is stored in the storage device, the pointer information for extracting the media data element to be contained in the reconstructed packet from the storage device, wherein the correspondence information is stored separately from the media data element, and the delivery control proxy apparatus includes:

a receiving portion to receive a delivery request from the client terminal, and a delivery control portion to give a storage instruction to the receiving portion or to give a delivery instruction to a delivery portion, wherein the delivery portion is configured for reconstructing the reconstructed packet having the same construction on the basis of the correspondence information for reconstructing the another packet, and for transmitting the reconstructed packet to the network at a timing in accordance with the reception time information.

4. A media delivery system according to claim 3, wherein the receiving portion generates the header information on a basis of information contained in the handled packet received from the server.

5. A media delivery proxy apparatus provided on a network at a network location between a server and a client, the media delivery proxy apparatus for relaying media data which is streaming-delivered from the server through the network to the client, the media delivery proxy apparatus comprising a receiving portion for receiving packets transmitted from the server to the network, a delivering portion for delivering packets reconstructed by the media delivery proxy apparatus to the client, and a storage device, wherein:

each of the packets contains a media data element which is a segment of the media data, and is constructed according to a predetermined media format protocol; and the receiving portion is configured to effect a storing process operating without regard to interpretation of a media format of the media data, to store information pertaining to each handled packet, enabling subsequent reconstructing of reconstructed packets having a same construction as that of the handled packets containing the media data elements, the storing process effecting, for each handled packet, operations to:

extract the media data element from a handled packet, store the media data element having been extracted, and store correspondence information pertaining to the media data element, with the correspondence information associating the media data element together with: header information storing at least one parameter of the media format of the handled packet for the enabling reconstructing of the reconstructed packet having the same construction as that of the handled packet containing the media data element; reception time information of the handled packet, the time information being a time of reception of the handled packet at the media delivery apparatus from the server relative to a time of reception of a predetermined reference handled packet from the server; and pointer information defining a storage space where the media data element is stored in the storage device, the pointer information for extracting the media data element to be contained in the reconstructed packet from the storage device, wherein the correspondence information is stored separately from the media data element; and wherein the delivering portion is configured to effect delivering of the reconstructed packets to the client without regard to interpretation of the media format of the media data, the delivering portion effecting, for each handled packet, operations to:

use the correspondence information pertaining to the media data element, to extract the stored media data element and to use the header information to reconstruct the reconstructed packet having the same construction as that of the handled packet containing the media data element; and deliver the reconstructed packet onto the network at a delivery timing which is relative to a delivering timing of a predetermined reference reconstructed packet, based upon the reception time information of the handled packet relative to the time of reception of the predetermined reference handled packet, respectively.

* * * * *